(12) United States Patent
Idei et al.

(10) Patent No.: US 7,284,014 B2
(45) Date of Patent: Oct. 16, 2007

(54) PRE-FETCH COMPUTER SYSTEM

(75) Inventors: Hideomi Idei, Yokohama (JP);
Kazuhiko Mogi, Yokohama (JP);
Norifumi Nishikawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 60 days.

(21) Appl. No.: 10/849,184

(22) Filed: May 20, 2004

(65) Prior Publication Data
US 2005/0203863 A1    Sep. 15, 2005

Related U.S. Application Data

(63) Continuation-in-part of application No. 10/409,989, filed on Apr. 7, 2003.

(30) Foreign Application Priority Data
Mar. 11, 2004    (JP) .............................. 2004-068347

(51) Int. Cl.
G06F 7/00 (2006.01)
G06F 12/00 (2006.01)
G06F 17/30 (2006.01)

(52) U.S. Cl. .................... 707/104.1; 707/201
(58) Field of Classification Search ............ 707/104.1, 707/102, 200; 382/100
See application file for complete search history.

(56) References Cited

U.S. PATENT DOCUMENTS

| | | | |
|---|---|---|---|
| 5,305,389 A * | 4/1994 | Palmer | 382/305 |
| 5,590,300 A | 12/1996 | Lautzenheiser | |
| 5,721,865 A | 2/1998 | Shintani et al. | |
| 5,765,213 A | 6/1998 | Ofer | |
| 5,778,436 A | 7/1998 | Kedem et al. | |
| 5,809,560 A | 9/1998 | Schneider | |
| 5,812,996 A | 9/1998 | Rubin et al. | |
| 5,822,757 A | 10/1998 | Chi | |

(Continued)

FOREIGN PATENT DOCUMENTS

JP    2003-150414    5/2003

(Continued)

OTHER PUBLICATIONS

Evaluation of Prefetching Mechanism Using Access Plan on Intelligent Disk by Mukai, et al. pp. 1-8.

(Continued)

*Primary Examiner*—Don Wong
*Assistant Examiner*—Helene Rose
(74) *Attorney, Agent, or Firm*—Mattingly, Stanger, Malur & Brundidge, P.C.

(57) ABSTRACT

A database (DB) server in which a database management system (DBMS) operates and a prefetch server connected to a storage device storing DB data are provided with an acquiring unit for acquiring information on a storage location on the storage device of a DB schema managed by the DBMS, information on DB processing executed by the DBMS, and information on an access to DB data made when the DBMS executes the DB processing, from the DB server, a predictor for predicting data to be read out on the basis of the acquired information, and a prefetch instructing unit for providing the storage device with an instruction to prefetch the corresponding data. Having received the prefetch instruction, the storage device reads out specified data onto a cache memory.

10 Claims, 11 Drawing Sheets

U.S. PATENT DOCUMENTS

| | | | |
|---|---|---|---|
| 5,918,246 | A | 6/1999 | Goodnow et al. |
| 6,065,037 | A | 5/2000 | Hitz et al. |
| 6,260,116 | B1 | 7/2001 | Davis et al. |
| 6,317,810 | B1 | 11/2001 | Lopez-Aguado et al. |
| 6,381,677 | B1 | 4/2002 | Beardsley et al. |
| 6,516,389 | B1 | 2/2003 | Uchihori |
| 6,567,894 | B1 | 5/2003 | Hsu et al. |
| 6,606,659 | B1 | 8/2003 | Hegli et al. |
| 6,675,280 | B2 | 1/2004 | Cooksey et al. |
| 6,687,807 | B1 | 2/2004 | Damron |
| 6,728,840 | B1 | 4/2004 | Shatil et al. |
| 6,754,679 | B2 * | 6/2004 | Oheda .................. 707/201 |
| 6,912,612 | B2 | 6/2005 | Kapur et al. |
| 6,928,451 | B2 * | 8/2005 | Mogi et al. .................. 707/102 |
| 2002/0002658 | A1 | 1/2002 | Okayasu |
| 2003/0093647 | A1 | 5/2003 | Mogi et al. |
| 2003/0105940 | A1 | 6/2003 | Cooksey et al. |
| 2003/0126116 | A1 | 7/2003 | Chen et al. |
| 2003/0172149 | A1 | 9/2003 | Edsall et al. |
| 2003/0208660 | A1 | 11/2003 | van de Waerdt |
| 2003/0212668 | A1 | 11/2003 | Hinshaw et al. |
| 2003/0221052 | A1 | 11/2003 | Yechiel |
| 2004/0054648 | A1 | 3/2004 | Mogi et al. |
| 2004/0064648 | A1 | 4/2004 | Brown et al. |
| 2004/0088504 | A1 | 5/2004 | Hsu et al. |
| 2004/0117398 | A1 * | 6/2004 | Idei et al. .................. 707/102 |
| 2004/0193807 | A1 | 9/2004 | Mogi et al. |

FOREIGN PATENT DOCUMENTS

| | | |
|---|---|---|
| JP | 2003 150414 | 5/2003 |
| JP | 2003 150418 | 5/2003 |
| JP | 2003-150418 | 5/2003 |
| JP | 2003-150419 | 5/2003 |
| JP | 2003 150419 | 5/2003 |

OTHER PUBLICATIONS

K. Mukai, et al "Evaluation of Prefetching Mechanism Using Access Plan on Intelligent Disk", pp. 1-21.

Evaluator Group, Inc., "Virtualization of Disk Storage", The Evaluator Sereis, Sep. 2000, pp. 1-12.

Patter, et al "Informed Prefetching and Caching", Department of Electrical and Computer Engineering, Carnegie Mellon University, SIGOPS '95 Dec. 1995 USA, pp. 79-95.

Mukai, et al "Evaluation of Prefetching Mechanism Using Access Plan on Intelligent Disk", Institute of Industrial Science, the University of Tokyo, Japan, pp. 1-8, Jul. 2000.

* cited by examiner

FIG. 2

STORAGE AREA INFORMATION 160

| LOGICAL UNIT NUMBER | LOGICAL BLOCK ADDRESS | PHYSICAL DISK NUMBER | PHYSICAL BLOCK ADDRESS |
|---|---|---|---|
| 0 | 0-199999 | 0 | 0-199999 |
| | 200000-399999 | 1 | 0-199999 |
| | 400000-599999 | 2 | 0-199999 |
| | ----- | ----- | ----- |
| 1 | 0-199999 | 0 | 20000-399999 |
| | 200000-399999 | 1 | 20000-399999 |
| | 400000-599999 | 2 | 20000-399999 |
| | ----- | ----- | ----- |
| ----- | ----- | ----- | ----- |

FIG. 3

RAW DEVICE INFORMATION 300 ~112

| RAW DEVICE FILE NAME 302 | STORAGE DEVICE ADDRESS 304 | LOGICAL UNIT NUMBER 306 | FIRST LOGICAL BLOCK ADDRESS 308 | NUMBER OF LOGICAL BLOCKS |
|---|---|---|---|---|
| /dev/rdsk/raw1 | 1000 | 0 | 0 | 67108864 |
| /dev/rdsk/raw2 | 1000 | 1 | 0 | 33554432 |
| /dev/rdsk/raw3 | 1000 | 1 | 33554432 | 16777216 |
| ...... | ...... | ...... | ...... | ...... |

FIG. 5A

DB SCHEMA INFORMATION 500

| SCHEMA ID | SCHEMA NAME 502 | SCHEMA TYPE 504 | DATA AREA ID 506 | SCHEMA SIZE 508 | START OFFSET OF DESTINATION 510 |
|---|---|---|---|---|---|
| 0 | TBL1 | TABLE | 0 | 200MB | 128 |
| 1 | TBL2 | TABLE | 0 | 100MB | 409984 |
| 2 | IDX1 | INDEX | 1 | 40MB | 128 |
| ------ | ------ | ------ | ------ | ------ | ------ |

INDEX INFORMATION 520

| INDEX SCHEMA ID | SCHEMA NAME 522 | INDEX TYPE 524 | CORRESPONDING TABLE SCHEMA ID 526 |
|---|---|---|---|
| 2 | IDX1 | B-TREE | 0 |
| 3 | IDX2 | B-TREE | 0 |
| 4 | IDX3 | B-TREE | 1 |
| ------ | ------ | ------ | ------ |

DB ACCESS INFORMATION (700)

| | |
|---|---|
| DBMS ID | 12 | 702
| QUERY ID | 114 | 704
| SCAN TYPE | TABLE SCAN | 706
| LOGICAL UNIT NUMBER OF ACCESS LOCATION | 0 | 708
| LOGICAL BLOCK ADDRESS OF ACCESS LOCATION | 208 | 710
| DATA SIZE | 8KB | 712

FIG. 7B

PREFETCH INSTRUCTION (720)

| LOGICAL UNIT NUMBER (722) | LOGICAL BLOCK ADDRESS (724) | PREFETCH DATA SIZE (726) |
|---|---|---|
| 0 | 485256 | 4KB |
| 0 | 547740 | 4KB |
| 0 | 523328 | 4KB |
| ----- | ----- | ----- |

FIG. 11

DB ACCESS INFORMATION — 1100

| | | |
|---|---|---|
| DBMS ID | 12 | 1102 |
| QUERY ID | 114 | 1104 |
| DB SCHEMA ID | TABLE 4 | 1106 |
| SCAN CONDITION | TBL2X=100 | 1108 |
| LOGICAL UNIT NUMBER OF ACCESS DESTINATION | 0 | 1110 |
| LOGICAL BLOCK ADDRESS OF ACCESS DESTINATION | 8398608 | 1112 |
| DATA SIZE | 4KB | 1114 |

FIG. 12

- PREFETCH PROCESSING (B) — 1200
- READ INDEX DATA TO BE ACCESSED FROM STORAGE DEVICE — 1202
- EXTRACT INDEX COINCIDENT WITH SCAN CONDITION BY REFERRING TO READ INDEX DATA — 1204
- CONSIDER TABLE DATA INDICATED BY EXTRACTED INDEX TO BE PREFETCHED AND ISSUE PREFETCH INSTRUCTION WITH DATA SETTING TO STORAGE DEVICE — 1206
- END OF PREFETCH PROCESSING (B) — 1208

PRE-FETCH COMPUTER SYSTEM

CROSS REFERENCE TO RELATED APPLICATION

The present application is a Continuation-in-Part of application Ser. No. 10/409,989, filed Apr. 7, 2003, by H. IDEI, et al., entitled "PREFETCH APPLICANCE SERVER".

INCORPORATION BY REFERENCE

The present application claims priority from Japanese Patent Application JP 2004-068347 filed on Mar. 11, 2004 and Japanese Patent Application JP 2002-358838, filed Dec. 11, 2002, the content of which is hereby incorporated by reference into this application.

BACKGROUND OF THE INVENTION

1. Field of the Invention

The present invention relates to a computer system (hereinafter, referred to as "DB system") for using a database (hereinafter, referred to as "DB").

2. Description of the Related Art

Currently there are a large number of applications constructed based on a database, thereby causing a database management system (hereinafter, referred to as "DBMS") for performing a series of processes and management related to the DB to be very important. One of DB characteristics is to handle immense volumes of data. Therefore, a storage device with a large disk is connected to a computer in which the DBMS operates to store DB data into the storage device in a large number of general environments of the DBMS operating in the DB system.

There is a method of providing a storage device with a cache memory, which is a volatile storage medium, as a method of accelerating data input or output processing to or from the storage device for use in the DB system or the like. In this method, the storage device temporarily stores the data, which is input or output to or from the storage device, in the cache memory. In general, a volatile cache memory makes a response more rapidly than a disk unit. Therefore, by storing data read from the disk unit in the cache memory previously so as to use the data in the cache memory at an access to the same data, the storage device is improved in the speed of response.

There is also a technique of predicting data read in the future and reading the predicted data onto the cache memory (hereinafter, also referred to as "prefetch") on the basis of a series of continuous data accesses (hereinafter, also referred to as "sequential access") detected by a storage device (or a computer).

In a paper entitled "Evaluation of Prefetching Mechanism Using Access Plan on Intelligent Disk" (by Mukai et al., the 11th Data Engineering Workshop (DEWS2000), Lecture No. 3B-3 of Proceedings, CD-ROM issued on July, 2000; Sponsored by The Institute of Electronics, Information and Communication Engineers (IEICE), Data Engineering Technical Group), there is discussed an improvement of a DBMS performance with sophisticating a storage device by giving an example of a DB managed by a relational database management system (RDBMS). If a query execution plan in the RDBMS is given to a storage device as the application-level knowledge, the storage device, after having read an index for a table in the RDBMS, gets capable of determining which block having data of the table should be accessed. Therefore, total data access time can be reduced by a sequential access to the index from the DBMS to grasp block groups having data of the table corresponding to the index by means of a computer executing the DBMS and effectively scheduling accesses to them.

In addition, this process is executed independently of a computer in which the DBMS is executed, by which there is no need to await an instruction from the computer. Furthermore, if data is distributed and allocated to a plurality of physical storage devices, the storage devices can be accessed in parallel and therefore a further reduction is expected in the DBMS process execution time.

JP-A-2003-150419 discloses a technology in which a storage device storing data in a database acquires location information of a DB schema and query execution information or the like necessary for a prefetch from the DBMS and executes the prefetch within the storage device in order to accelerate an access to data of the database stored in the storage device.

The use of the cache memory and the data prefetch mentioned in the description of the conventional technologies are specialized in processes within the storage device. Furthermore, the prefetch has an effect on a sequential access, but it does not have much effect on a nonsequential data access.

In the conventional technology described in "Evaluation of Prefetching Mechanism Using Access Plan on Intelligent Disk," there is a problem of insufficient clarification on what kind of process need be executed and what kind of data should be used after the storage device receives a query execution plan in the RDBMS as an application-level knowledge.

Furthermore, in the technology described in JP-A-2003-150419, the storage device acquires location information of a DB schema and query execution information necessary for the prefetch from the DBMS and executes the prefetch within the storage device. If the technology is implemented, however, it is necessary to improve the inside of the storage device. In addition, if it is applied to an existing DB system, there is a need for replacing an existing storage device with the storage device in which the technology is implemented and for shifting the DB data to the storage device. Therefore, during these operations, it is likely to hinder a routine work. Furthermore, while the storage device (or a computer) needs to perform new prefetch-related processing in addition to the normal data read processing, it may give a heavy load to the storage device and the like and thus it may block the effect of reduction in the access time.

SUMMARY OF THE INVENTION

To resolve the above problems, the present invention has been provided. It is an object of the present invention to provide a system wherein a computer giving an instruction of a prefetch (hereinafter, referred to as a prefetch server) is connected to a DB server in which the DBMS operates and to a storage device for storing DB data.

The prefetch server acquires information on a storage location on the storage device of the DB schema managed by the DBMS, information on DB processing executed by the DBMS, and information on an access to the DB data to be made when the DBMS executes the DB processing from the DB server, predicts data to be read in the future on the basis of the above information, and instructs the storage device to prefetch the corresponding data. The storage device, which has received the prefetch instruction, reads out the specified data onto the cache memory.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing an illustrative structure of storage area information 170;

FIG. 3 is a diagram showing an illustrative structure of raw device information 112;

FIGS. 5A-5B are diagrams showing illustrative structures of the DB management information 116;

FIGS. 7A-7B are diagrams showing an illustrative structure of DB access information 700 and that of a prefetch instruction 720;

FIG. 11 is a diagram showing an illustrative structure of DB access information 1100 in a second embodiment; and FIG. 12 is a flowchart showing an illustrative procedure for the prefetch processing (b) in the second embodiment.

DETAILED DESCRIPTION OF THE EMBODIMENTS

The embodiments of the present invention will now be described in detail hereinafter. It should be noted, however, that the present invention is not limited to the following.

Figure 1:
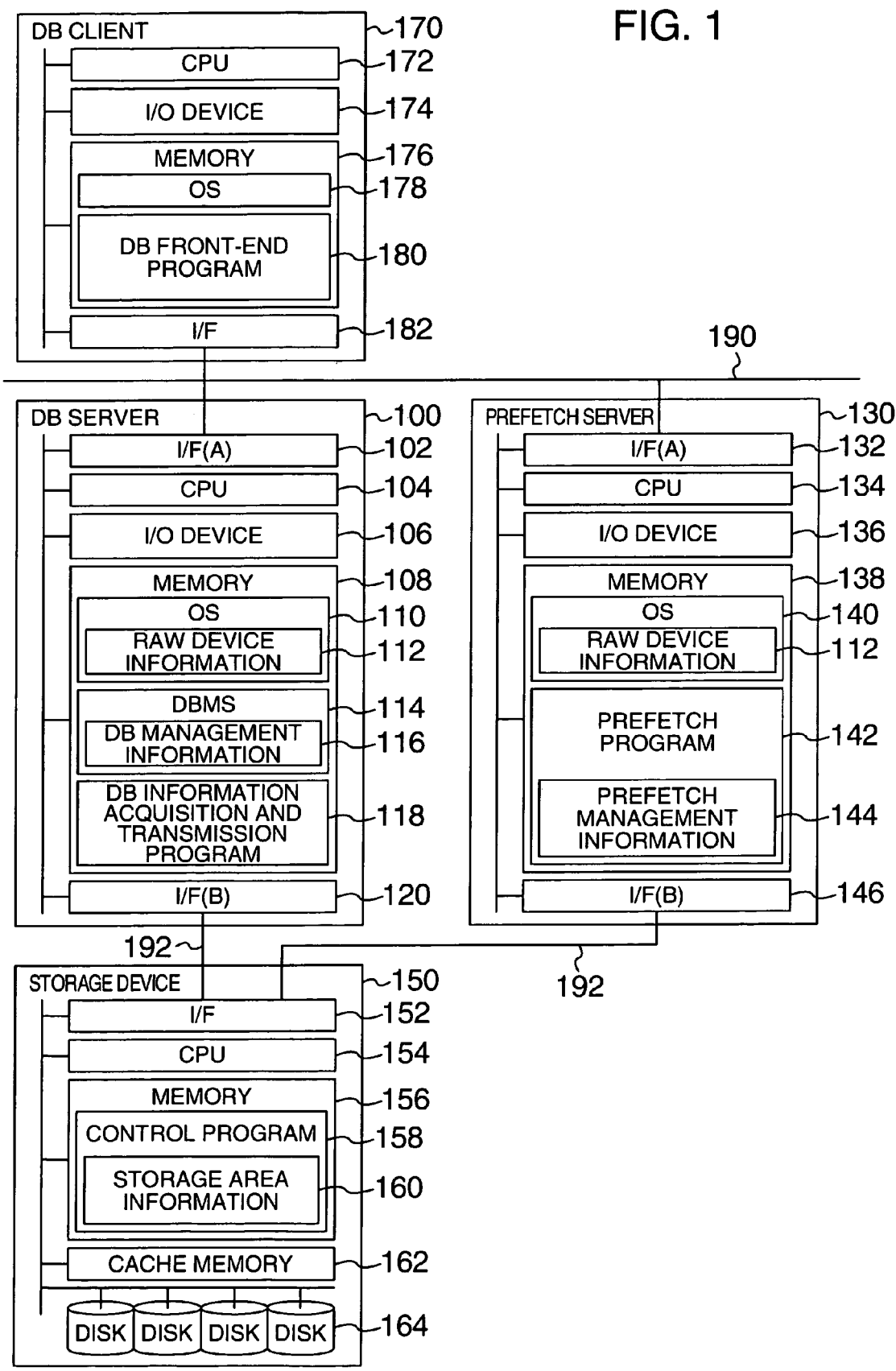
FIG. 1 is a diagram showing an illustrative system configuration according to a first embodiment of the present invention.

Referring to FIG. 1, there is shown a diagram of an example of a first embodiment of a system to which the present invention is applied.

The system comprises: a DB server 100; a prefetch server 130; a storage device 150; a DB client 170; a network 190 for connecting the DB server 100, the prefetch server 130, and the DB client 170 with each other; and a network 192 for connecting the DB server 100, the prefetch server 130, and the storage device 150 with each other.

The DB server 100 executes a DBMS, which controls a database (DB) stored in the storage device 150. The prefetch server 130 predicts data to be accessed in the future by the DB server 100 on the basis of information obtained from the DB server 100. Then, the prefetch server 130 transmits an instruction of previously reading data (hereinafter, also referred to as "prefetch") to the storage device 150 on the basis of a result of the prediction.

The storage device 150 stores DB or other data to be used by the DB server 100. The DB client 170 requests the DB server 100 to execute a query accepted from a user. The network 190 is a local area network (LAN), a wide area network (WAN), or some other network. On the other hand, the network 192 can be either a LAN or a network comprising fibre channels and the like (storage area network: SAN).

The same network can be used for the network 190 and the network 192. While the DB server 100, the storage device 150, and the DB client 170 are singly arranged in FIG. 1, a plurality of those are also applicable.

The DB server 100 is a general computer, having an I/F(A) 102 as an interface with the network 190, a CPU (control processor) 104, an I/O (input/output) device 106, a memory 108, an I/F(B) 120 as an interface with the network 192. The memory 108 stores an operating system (hereinafter, referred to as "OS") 110, a DBMS 114, and a DB information acquisition and transmission program 118.

The CPU 104 executes the OS 110, the DBMS 114, and the DB information acquisition and transmission program 118. The OS 110 retains raw device information 112 for associating raw devices with logical storage areas on the storage device 150. The raw devices are logical storage devices managed by the OS. The DBMS 114 retains DB management information 116 necessary for DB operations management.

The prefetch server 130 is a general computer like the DB server 100, having an I/F(A) 132 as an interface with the network 190, a CPU (control processor) 134, an I/O device 136, a memory 138, and an I/F(B) 146 as an interface with the network 192.

The memory 138 stores an OS 140 and a prefetch program 142. The CPU 134 executes the OS 140 and the prefetch program 142. The OS 140 retains the same information as the raw device information 112 of the DB server 100. More specifically, the prefetch server 130 receives an input of a content of the raw device information 112 of the DB server 100 such as a system manager, or the DB server 100 automatically transmits the content of the raw device information 112 to the prefetch server 130. The prefetch program 142 retains prefetch management information 144 necessary for prefetch processing.

The storage device 150 comprises an I/F 152 as an interface with the network 192, a CPU (control processor) 154, a memory 156, a cache memory 162, and a disk 164. The memory 156 stores a control program 158 for controlling the storage device 150. The CPU 154 executes the control program 158. The control program retains storage area information 160 for associating logical storage areas of the storage device 150 with physical storage areas of the disk 164. The disk 164 is a storage medium, which can be either a hard disk drive or an optical disk. The storage device 150 can have a RAID configuration of a plurality of disks. The DB client 170 is a general computer like the DB server 100 and the prefetch server 130, having a CPU (control processor) 172, an I/O device 174, a memory 176, an I/F 182 as an interface with the network 190. The memory 176 stores an OS 178 and a DB front-end program 180. The CPU 172 executes the OS 178 and the DB front-end program 180.

The above various programs are installed in the devices via portable storage mediums or networks.

Referring to FIG. 2, there is shown a diagram of an illustrative structure of the storage area information 160 retained by the control program 158 of the storage device 150.

The storage area information 160 is for use in associating logical storage areas in the storage device 150 (hereinafter, referred to as "logical units") with physical storage areas where data is stored practically. The storage area information 160 has a corresponding entry for each logical unit. Each entry has a field 200 for registering a logical unit number for use in identifying a logical unit, a field 202 for registering a logical block number (hereinafter, referred to as "logical block address") in the logical unit, a field 204 for registering a physical disk number for use in identifying a disk having a physical block corresponding to the logical block, and a field 206 for registering a physical block number (hereinafter, referred to as "physical block address") corresponding to the logical block.

The term "block" means a unit for handling the storage areas, generally of 512 KB. While there is a need for a logical block to correspond to a physical block by one to one, there is no need for all logical blocks to exist on the same disk. The storage device 150 accepts an access with a logical unit and a logical block address from the DB server 100 or the prefetch server 130. The storage device 150 determines a physical disk number and a physical block address of a physical block corresponding to the logical unit and the logical block from the storage area information 160 and practically makes an access.

Referring to FIG. 3, there is shown a diagram of an illustrative structure of the raw device information 112 retained by the OS 110 of the DB server 100 and the OS 140 of the prefetch server 130.

The raw device information 112 is for use in associating the raw devices of the OS 110 with the storage areas on the storage device 150 allocated to the raw devices. The raw device information 112 has a corresponding entry for each raw device. Each entry has a field 300 for registering a file name of a raw device, a field 302 for registering a device address of a storage device having a storage area allocated to the raw device, a field 304 for registering a logical unit number of a logical unit having the allocated storage area, a field 306 for registering a first logical block address on the logical unit of the allocated storage area, and a field 308 for registering the number of logical blocks of the allocated storage area.

In this embodiment, the DB server 100 and the prefetch server 130 need to access storage areas on the same storage device, and therefore the OS 110 of the DB server 100 and the OS 140 of the prefetch server 130 have the raw device information 112 having completely the same contents, respectively.

Figure 4A:
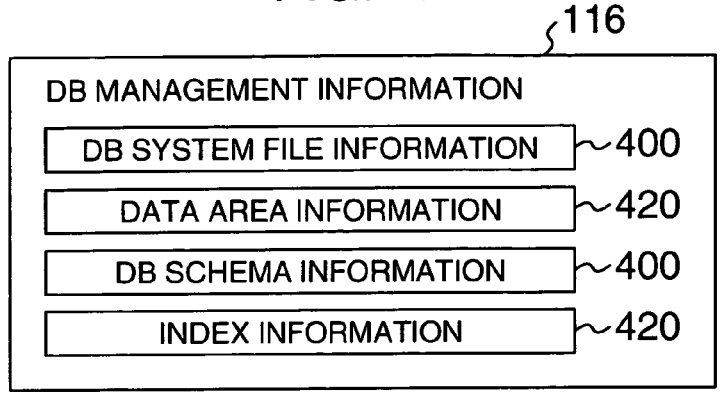
FIGS. 4A-4C are diagrams showing illustrative structures of a DB management information 116.

Referring to FIG. 4A, there is shown a diagram of an illustrative structure of the DB management information 116 retained by the DBMS 114. The DB management information 116 is set by a manager or the like at DB initialization.

The DB management information 116 includes DB system file information 400 as setting information on DB system files, data area information 420 as setting information on data areas, DB schema information 440 as setting information on DB schemas such as tables and indices, and index information 460 as setting information on indices.

Figure 4B:
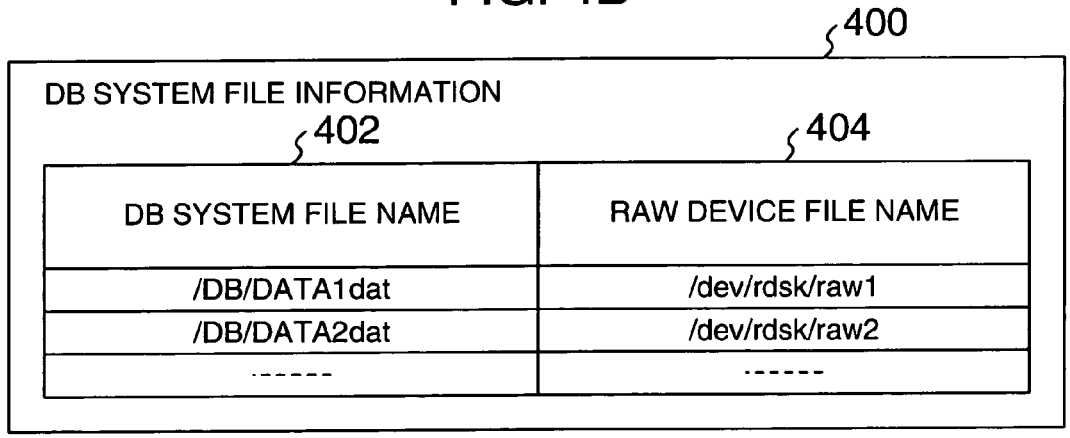

Referring to FIG. 4B, there is shown a diagram of an illustrative structure of the DB system file information 400.

The DB system file information 400 is for use in associating the DB system file with the raw device stated above. The DB system file information 400 has an entry for each DB system file. Each entry has a field 402 for registering a file name of a DB system file and a field 404 for registering a raw device file name under which the DB system file is registered.

The DB system file is a single large file to be created for a raw device. The DBMS 114 constructs a DB by writing DB data into the DB system file. Regarding the DB data written into the DB system file, the OS 110 determines a logical storage area of the storage device 150 into which the data is practically written from the raw device information 112 stated above. Then, the OS 110 issues a data write instruction to the storage device 150 on the basis of the determined information.

Figure 4C:
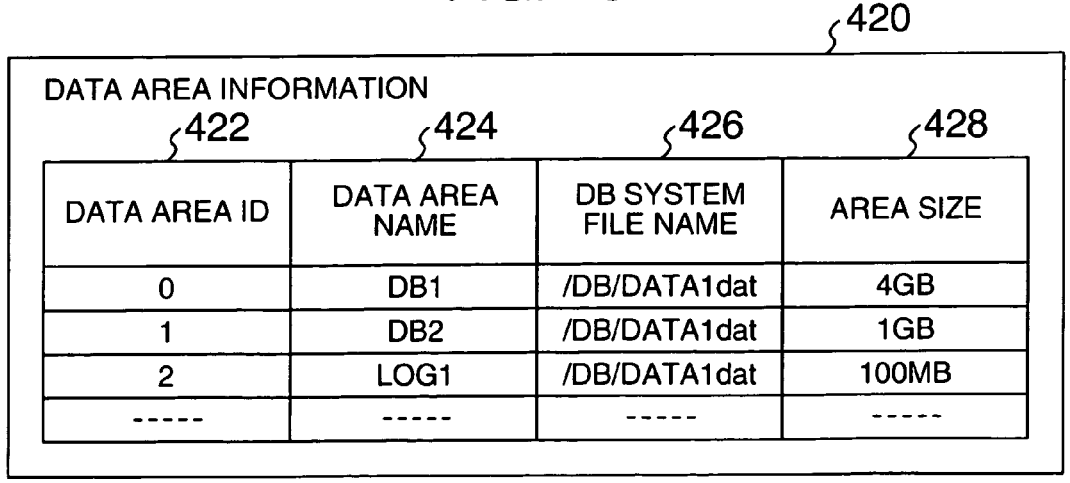

Referring to FIG. 4C, there is shown a diagram of an illustrative structure of the data area information 420.

The data area information 420 is setting information on data areas managed by the DBMS 114. The data area information 420 has an entry for each data area. Each entry has a field 422 for registering a data area ID for use in identifying a data area, a field 424 for registering a name of the data area, a field 426 for registering a file name of a DB system file in which the data area is generated, and a field 428 for registering an area size allocated to the data area.

The data area is for use in storing DB data and it is generated on the DB system file.

Referring to FIG. 5A, there is shown an illustrative structure of the DB schema information 440.

The DB schema information 440 is setting information on DB schemas such as table and indices managed by the DBMS 114. The DB schema information 440 has an entry for each DB schema. Each entry has a field 500 for registering a DB schema ID for use in identifying a DB schema, a field 502 for registering a name of the DB schema, a field 504 for registering a type of the DB schema, a field 506 for registering a data area ID for use in identifying a data area into which the DB schema is written, a field 508 for registering a size of the DB schema, and a field 510 for registering an offset on the data area into which the DB schema is written.

Referring to FIG. 5B, there is shown a diagram of an illustrative structure of the index information 460.

The index information 460 is setting information on indices in the DB schema. The index information 460 has an entry for each index. Each entry has a field 520 for registering a DB schema ID for use in identifying an index, a field 522 for registering a DB schema name of the index, a field 524 for registering a type of the index, and a field 526 for registering a DB schema ID for use in identifying a table corresponding to the index.

A system behavior in this embodiment will be briefly described below.

After activating the DBMS 114 by itself or changing the DB configuration, the DB server 100 transmits the DB configuration stored in the storage device 150, particularly information indicating a storage location of the DB schema (DB schema location information) to the prefetch server 130.

Thereafter, upon accepting a query (a content of a DB operation or of processing for the DB), the DB server 100 sends information on the query (DB processing information) to the prefetch server 130. Furthermore, the DB server 100 sends information on the DB to be accessed (DB access information) to the prefetch server 130 before accessing the DB data. Thereafter, the DB server 100 makes an access to the storage device 150.

On the other hand, the prefetch server 130, which has received the above information, predicts which storage area of the storage device 150 the DB server 100 accesses on the basis of the information. Then, the prefetch server 130 generates a prefetch instruction on the basis of a result of the prediction and transmits it to the storage device 150.

The storage device 150, which has received the prefetch instruction, reads out data in the storage area specified by the prefetch instruction and stores it into the cache memory 162.

Figures 6A, 6B, 6C:
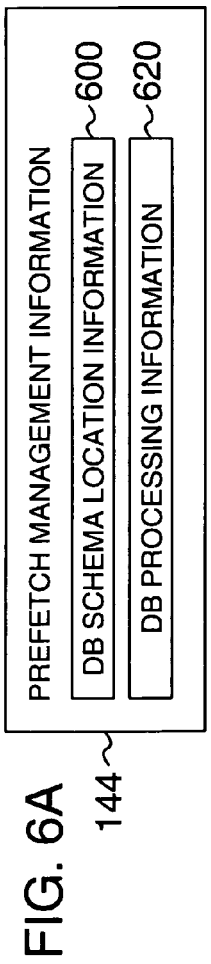
FIGS. 6A-6C are diagrams showing illustrative structures of prefetch management information 144.

Referring to FIG. 6A, there is shown a diagram of an illustrative structure of the prefetch management information 116 retained by the prefetch program 142.

The prefetch management information 116 has DB schema location information 600 as logical location information of respective DB schemas and DB processing information 620 as information on executions of queries.

Referring to FIG. 6B, there is shown a diagram of an illustrative structure of the DB schema location information 600.

The DB schema location information 600 is for use in indicating actual locations where the DB schemas are stored in the storage areas of the storage device 150. The DB schema location information 600 has an entry for each DB schema.

Each entry has a field 602 for registering a DBMS ID for use in identifying a DBMS having a DB schema, a field 604 for registering a DB schema ID for use in identifying the DB schema, a field 606 for registering a type of the DB schema, a field 608 for registering a file name of a raw device into which the DB schema is written, a field 610 for registering a logical unit number of the storage device 150 into which the DB schema is written, and a field 612 for registering a logical unit address of the storage device 150 into which the DB schema is written. The DBMS ID is a value previously allocated as a unique value to each DBMS by a manager or the like.

The DB server 100 executes the DB information acquisition and transmission program 118, thereby acquiring the DB schema location information 600 from the OS 110 and the DBMS 114 and transmitting it to the prefetch server 130. More specifically, the DB information acquisition and transmission program 118 generates the DB schema location information 600 on the basis of contents of the DB management information 116 and the raw device information 112 retained by the DB server 100 and the DBMS ID information (or collects information forming the DB schema location information 600) and transmits it to the prefetch server 130. The transmission is performed at the time of activating the DBMS 114 and at the time of changing the DB configuration.

Referring to FIG. 6C, there is shown a diagram of an illustrative structure of the DB processing information 620.

The DB processing information 620 is information on queries executed by the DBMS 114 and on searches executed for the queries (table scans and index scans: Hereinafter, also referred to as "scans"). The DB processing information 620 has an entry for each scan for each query. Each entry has a field 622 for registering a DBMS ID for use in identifying the DBMS executing a query, a field 624 for registering a query ID for use in identifying the query to be executed, a field 626 for registering a scan ID for use in identifying a scan executed within the query, a field 628 for registering a DB schema ID for use in identifying the DB schema to be accessed with the scan, and field 630 for registering a type of the scan.

The DB information acquisition and transmission program 118 acquires the DB processing information 620 for the query, which has been accepted from the DB client 170, from the DBMS 114 and transmits it to the prefetch server 130.

Referring to FIG. 7A, there is shown a diagram of an illustrative structure of the DB access information 700 transmitted from the DB server 100 to the prefetch server 130.

The DB access information 700 is for use in making an access to DB data from the DBMS 114. The DB access information 700 has a field 702 for registering a DBMS ID for use in identifying a DBMS 114 executing a query, a field 704 for registering a query ID for use in identifying the executed query, a field 706 for registering a type of an executed scan, a field 708 for registering a logical unit number on the storage device 150 storing data to be accessed, a field 710 for registering a logical unit address on the storage device 150 storing the data to be accessed, and a field 712 for registering a size of the data to be accessed.

As stated above, the DB server 100 generates DB access information 700 every time the DBMS 114 accesses the DB data and transmits it to the prefetch server 130.

Referring to FIG. 7B, there is shown a diagram of an illustrative structure of a prefetch instruction 720 issued to the storage device by the prefetch server 130.

The prefetch instruction 720 is information indicating a location of data to be prefetched and has an entry for each data to be prefetched. Each entry has a field 720 for registering a logical unit number on the storage device 150 storing data to be prefetched, a field 724 for registering a logical block address on the storage device 150 storing the data to be prefetched, and a field 726 for registering a size of the data to be prefetched.

The storage device 150, which has received the prefetch instruction 720, determines a physical position of the corresponding data from the storage area information 160 and reads it out onto the cache memory 162. Thereafter, the storage device 150 having received a DB access instruction transmits data previously read onto the cache memory 162 to the DB server 100.

Hereinafter, there is described a procedure for transmission processing of various information (hereinafter, referred to as "DB information acquisition and transmission processing") to the prefetch server 130 executed by the DB server 100 and a procedure for prefetch instruction generation and transmission processing (hereinafter, referred to as "prefetch processing") executed by the prefetch server 130. The DB is assumed to have been constructed (the DB management information 116 has already been generated).

Figure 8:
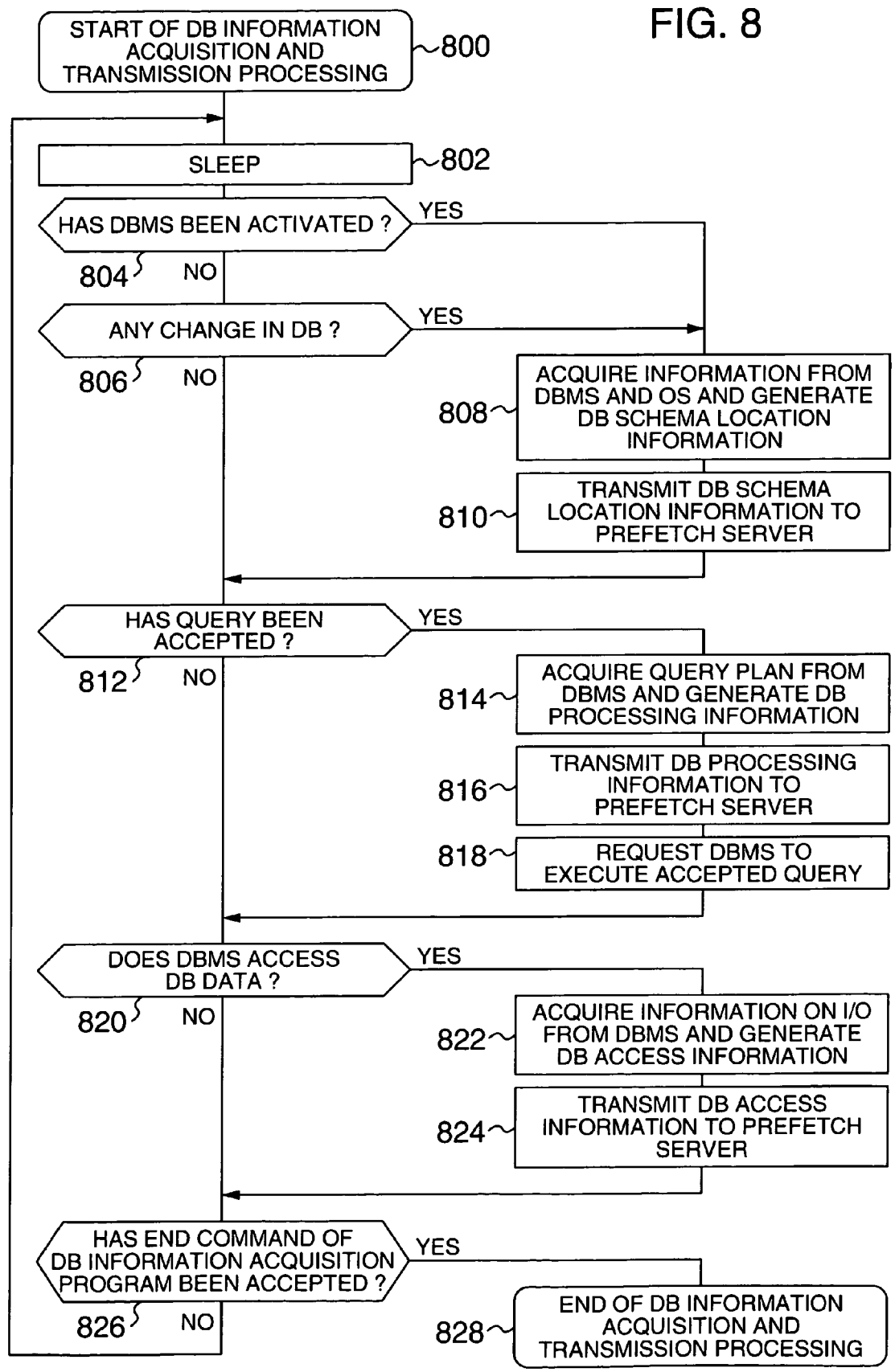
FIG. 8 is a flowchart showing an illustrative procedure for DB information acquisition processing.

Referring to FIG. 8, there is shown a flowchart of an illustrative procedure for DB information acquisition and transmission processing executed on the DB server 100. If a term "program" is used as a subject in the following description, it is assumed that a CPU executing the program performs the corresponding processing in practice.

The system administrator activates the DB information acquisition and transmission program 118 on the DB server 100 to start the DB information acquisition and transmission processing (step 800).

The DB information acquisition and transmission program 118 enters sleep mode (standby mode) immediately after it is activated. The DB information acquisition and transmission program 118 continues to await an interruption at each step described below (step 802).

If the DBMS 114 is activated (step 804) or if there is any change in the DB (step 806), the DB information acquisition and transmission program 118 acquires necessary information (the DB management information 116 and the raw device information 112) from the DBMS 114 and the OS 110 to generate DB schema location information 600 (step 808) and transmits it to the prefetch server 130 (step 810). If the DBMS 114 is operating when the DB information acquisition and transmission program 118 is activated, the DB information acquisition and transmission program 118 executes processes of step 808 and step 810 immediately.

When accepting a query from the DB client 170 (step 812), the DB information acquisition and transmission program 118 acquires a query plan of the query from the DBMS 114 to generate DB processing information (step 814) and transmits it to the prefetch server 130 (step 816). Thereafter, the DB information acquisition and transmission program 118 requests the DBMS 114 to execute the accepted query (step 818).

If the DBMS 114 accesses DB data to execute the query (step 820), the DB information acquisition and transmission program 118 acquires information on the access to the DB data (hereinafter, also referred to as "I/O) from the DBMS 114 immediately before issuing an access request to the DB and generates DB access information 700. The DB information acquisition and transmission program 118 detects the I/O issue on the basis of a call before the I/O issue from the DBMS or the OS (step 822). Thereafter, the DB information acquisition and transmission program 118 transmits the generated DB access information 700 to the prefetch server 130 (step 824).

When accepting an end command of the DB information acquisition and transmission program 118 from the system administrator or the like (step 826), the DB information acquisition and transmission program 118 terminates the processing (step 828).

Figure 9:
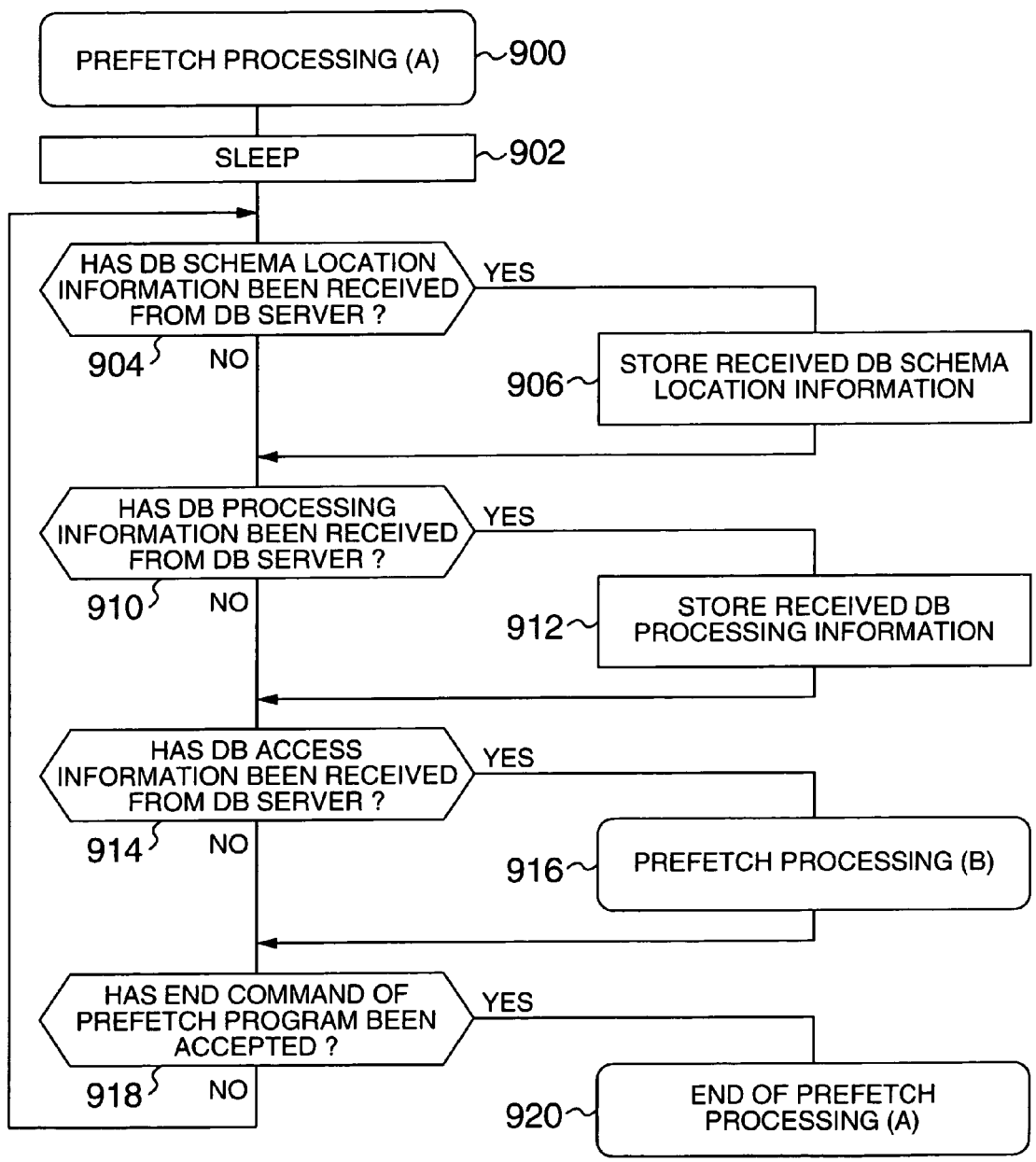
FIG. 9 is a flowchart showing an illustrative procedure for prefetch processing.

Referring to FIG. 9, there is shown a flowchart of an illustrative procedure for prefetch processing executed in the prefetch server 130.

The system administrator activates the prefetch program 142 on the prefetch server 130 to start the prefetch processing (A) (step 900). The prefetch program 142 need be activated earlier than the DB information acquisition and transmission program 118 described above.

The prefetch program 142 sleeps immediately after it is activated (step 902) and awaits transmissions of the DB schema location information 600, the DB processing information 620, and the DB access information 700 from the DB information acquisition and transmission program 118 operating on the DB server 100.

When receiving the DB schema location information 600 (step 904), the prefetch program 142 stores the received DB schema location information 600 as a part of the prefetch management information 144 (step 906).

When receiving the DB processing information 620 (step 910), the prefetch program 142 stores the DB processing information 620 as a part of the prefetch management information 144 (step 912).

When receiving the DB access information 700 (step 914), the prefetch program 142 executes prefetch processing (b) 1000 described later (step 916).

When accepting the end command of the prefetch program 142 from the system administrator or the like (step 918), the prefetch program 142 terminates the prefetch processing (A) (step 920).

Figure 10:
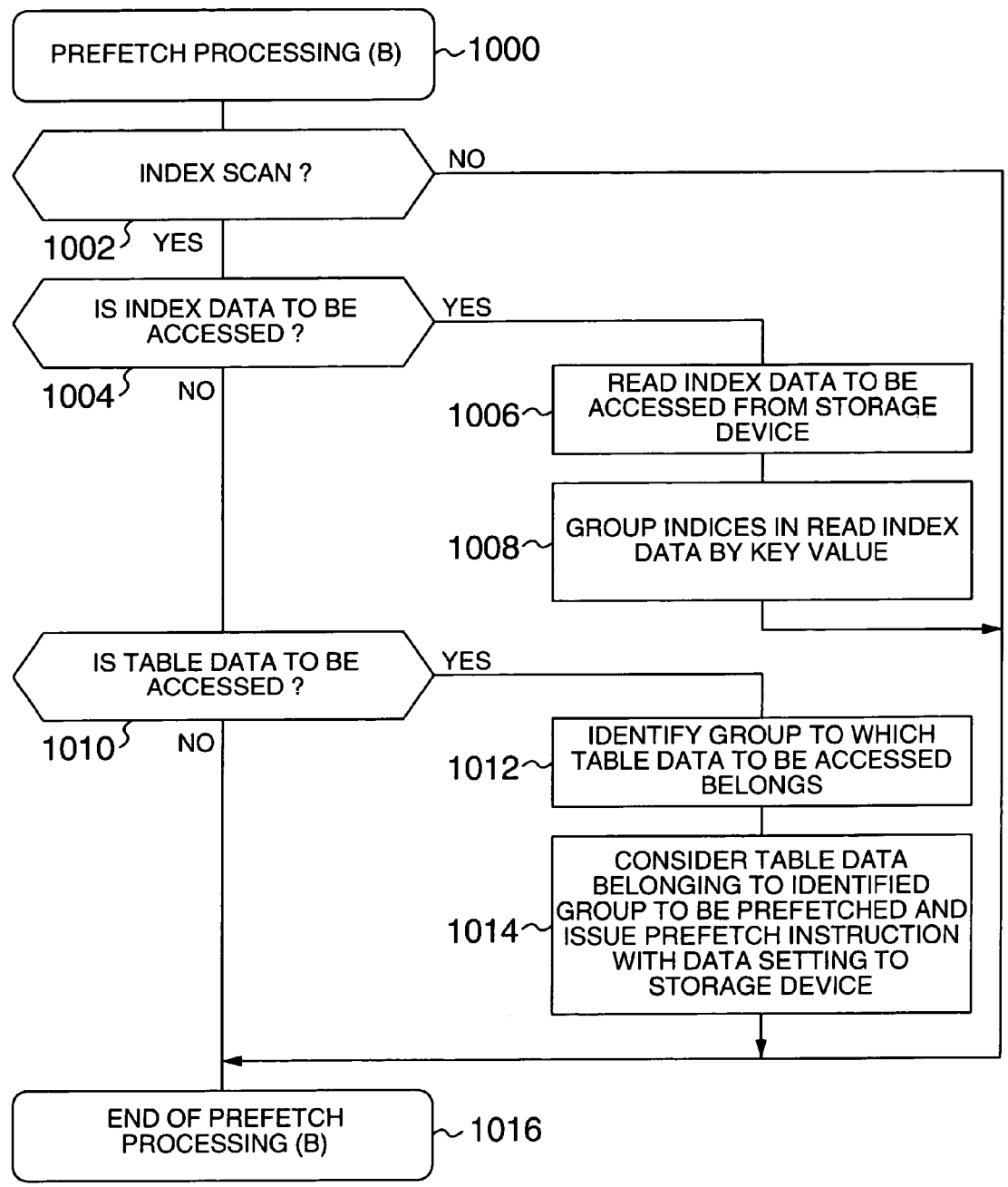
FIG. 10 is a flowchart showing an illustrative procedure for prefetch processing.

Referring to FIG. 10, there is shown a flowchart of an illustrative procedure for the prefetch processing (b) executed by the prefetch server 130. The prefetch program 142 executes the prefetch processing (B) 1000 when receiving the DB access information 700. First, by referring to a scan type 706 in the acquired DB access information 700, it is determined whether an index scan is a content of the access from the DB server 100, which has caused the transmission of the DB access information 700 (step 1002).

Unless the content of the access is determined to be an index scan in step 1002, the prefetch program 142 terminates the prefetch processing (B) (step 1016).

If the content of the access is determined to be an index scan in step 1002, the prefetch program 142 determines whether the data to be accessed is index data by referring to a DBMS ID 702, a query ID 704, an access destination logical unit number 708, and an access destination logical block address 710 in the acquired DB access information 700, the DB schema location information 600, and the DB processing information 620 (step 1004).

If the data to be accessed is determined to be index data in step 1004, the prefetch program 142 reads out the index data to be accessed from the storage device 150 (step 1006). Then, the prefetch program 142 partitions indices in the index data which has been read out into groups by key value (step 1008) and terminates the prefetch processing (B) (step 1016).

Unless the data to be accessed is determined to be index data in step 1004, the prefetch program 142 determines whether the data to be accessed is table data (step 1010).

If the data to be accessed is table data in step 1010, the prefetch program 142 identifies a group to which the table data to be accessed belongs among the groups generated in step 1008. More specifically, the prefetch program 142 identifies table data to be accessed from the location information of the DB access information 700 received from the DB server 100 and identifies a group including the table data (step 1012). Then, the prefetch program 142 generates a prefetch instruction for reading out table data corresponding to an index belonging to the identified group. Thereafter, the prefetch program 142 issues the generated prefetch instruction 720 to the storage device 150 (step 1014) and terminates the prefetch processing (B).

Unless the data to be accessed is determined to be table data in step 1010, the prefetch program 142 terminates the prefetch processing (B) (step 1016).

According to the above procedure, the prefetch server 130 predicts data to be accessed in the future by the DB server 100 and gives a prefetch instruction of the corresponding data to the storage device 150. The storage device 150, which has received the instruction, reads out the specified data onto the cache memory 162. As a result, when the DB server 100 accesses the DB data on the storage device 150, not all data, but most of data is prefetched in the cache memory 162 of the storage device 150, thereby reducing the access time by an amount of time for reading data from a disk and thus improving the access performance.

A second embodiment of the present invention will now be described hereinafter by using FIG. 11 and FIG. 12.

The difference between the first embodiment and the second embodiment exists in the content of the DB access information transmitted from the DB server 100 to the prefetch server 130 and the content of the prefetch processing (B) based on the difference. Other processing and configurations are the same as those described in the first embodiment. The following describes the parts different from the first embodiment.

Referring to FIG. 11, there is shown a diagram of an illustrative structure of DB access information 1100 in the second embodiment.

The DB access information 1100 has a field 1102 for registering a DBMS ID for use in identifying a DBMS executing a query, a field 1104 for registering a query ID for use in identifying the query under the execution, a field 1106 for registering a DB schema ID for use in identifying an index schema to be accessed, a field 1108 for registering a scan condition, a field 1110 for registering a logical unit number on a storage device 150 storing data to be accessed, a field 1112 for registering a logical unit address on the storage device 150 storing the data to be accessed, and a field 1114 for registering a size of the data to be accessed.

In this embodiment, the DB server 100 transmits the DB access information 1100 to the prefetch server 130 only when the DBMS 114 accesses the DB data for the purpose of an index scan. The second embodiment differs from the first embodiment in this respect. The DB server 100 determines whether the access from the DBMS 114 is an index scan on the basis of the contents of the received query and the DB management information 116.

Referring to FIG. 12, there is shown a flowchart of an illustrative procedure for the prefetch processing (B) in the second embodiment.

When receiving the DB access information 1100, the prefetch program 142 executes prefetch processing (B) 1200. First, index data to be accessed, which has caused the transmission of the DB access information 1100, is read from the storage device 150 (step 1202). Then, the prefetch program 142 extracts an index coincident with a scan condition 1108 from the indices within the index data, which has been read out (step 1204).

Thereafter, the prefetch program 142 considers table data associated with the extracted index as data to be prefetched. Then, the prefetch program 142 generates a prefetch instruction 720 for use in prefetching the table data to be prefetched into the storage device 150. Thereafter, the prefetch program 142 issues the generated prefetch instruction 720 to the storage device 150 (step 1206) and terminates the prefetch processing (B) 1200.

According to the above procedure, not all data, but most of data is prefetched on the cache memory 162 of the storage device 150 when the DB server 100 accesses the DB data on the storage device 150 in this embodiment, similarly to the first embodiment. It thus reduces an amount of time necessary for the storage device 150 to read out data from a disk, thereby improving the access performance.

In the first embodiment, index data to be accessed is read out and groups are generated by key value, and thereafter access information of table data is received and a group is identified before giving a prefetch instruction to the storage device 150. On the other hand, in the second embodiment, a scan condition is acquired together with the information of the index data to be accessed and a prefetch instruction can be given to the storage device 150 at the time of reading out the index data.

Under the environment in which a plurality of storage devices 150 are connected to the DB server 100, the present invention can be put into practice with the same contents as described above. In this condition, the DB server 100 issues an I/O to the plurality of storage devices 150 on the basis of the raw device information 112. At that time, the DB server 100 transmits DB access information on the plurality of storage devices 150 to the prefetch server 130. The prefetch server 130, which has received individual DB access information, identifies the storage device 150 corresponding to the individual DB access information by using the raw device information 112 and transmits a generated prefetch instruction to the individual storage device 150.

According to the present invention, the DB system comprising the DB server and the storage device enables a reduction in time for accessing DB data stored in the storage device without a significant change of an existing DB system.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system comprising:
a first computer connected to a client;
a storage device which includes a cache memory and is connected to said first computer; and
a second computer which is connected separately and directly to said first computer and said storage device,
wherein said first computer executes a database management program,
wherein said storage device stores a database,
wherein said second computer instructs said storage device to prefetch data stored in the database based on information for use in accessing the database, said information being transmitted from said first computer when said first computer accesses the database stored in said storage device, and
wherein said second computer predicts data to be accessed next by said first computer based on information on a database operation executed by said first computer, and information for use in accessing the database and instructs said storage device to perform the prefetch including an instruction of reading out the predicted data to said cache memory of said storage device.

2. A computer system according to claim 1, wherein said second computer acquires the information for use in accessing the database from said first computer.

3. A computer system according to claim 2, wherein said first computer transmits the information for use in accessing the database to said second computer when said first computer accesses the database stored in said storage device.

4. A computer system according to claim 3, wherein said storage device includes a cache memory,
wherein said second computer predicts data to be accessed by said first computer on the basis of information on a configuration of the database, information on a database operation executed by said first computer, and information for use in accessing the database and instructs said storage device to perform the prefetch including an instruction of reading out the predicted data to said cache memory.

5. A computer system according to claim 4, wherein said first computer transmits the information on the database configuration to said second computer when said first computer has started the execution of the database management program or when the execution of the database management program causes a change of the database configuration.

6. A computer system according to claim 5, wherein said first computer transmits the information on the database operation to said second computer when said first computer has received a query.

7. A computer system according to claim 6, wherein the information for use in accessing the database includes information on a type of the data to be accessed by said first computer,
wherein, if the data type is index data, said second computer reads out the index data from said storage device at the time of the prediction to group the index data on the basis of a predetermined condition; and if the data type is table data, said second computer identifies a group including the table data among the index data groups at the time of the prediction, generates an instruction of reading out the table data specified with the index data belonging to the group onto said cache memory, and transmits the generated instruction to said storage device.

8. A computer system according to claim 7, wherein the information for use in accessing the database includes a condition of a search for the database performed by said first computer and information on the index data read by said first computer, and wherein said second computer reads out the index data from said storage device at the time of the prediction, extracts an index coincident with the condition of the search from the index data having been read out, and transmits an instruction of reading out table data corresponding to the extracted index onto said cache memory to said storage device.

9. A computer system according to claim 8, further comprising a second storage device,
wherein said second computer instructs said storage device and said second storage device to perform the prefetch.

10. A computer system comprising:
a first computer connected to a client;
a storage device which includes a cache memory and is connected to said first computer; and
a second computer which is connected separately and directly to said first computer and to said storage device,
wherein said first computer executes a database management program,
wherein said storage device stores a database and includes a cache memory,
wherein said first computer transmits information on a configuration of the database to said second computer when said first computer has started the execution of the database management program or when the execution of the database management program causes a change of the database configuration, transmits information on a database operation to said second computer when said first computer has received a query, and transmits information for use in accessing the database to said second computer when said first computer accesses the database stored in said storage device,
wherein the information for use in accessing the database includes information on a type of data to be accessed by said first computer,
wherein, if the data type is index data, said second computer reads out the index data from said storage device and groups the index data based on a predetermined condition, and if the data type is table data, said second computer identifies a group including the table data among the index data groups, generates an instruction of reading out the table data specified with the index data belonging to the group onto said cache memory, and transmits the generated instruction to said storage device,
wherein said storage device, which has received the instruction, reads out the table data based on the instruction onto said cache memory, and
wherein said second computer predicts data to be accessed next by said first computer based on information on a database operation executed by said first computer, and information for use in accessing the database and instructs said storage device to perform the prefetch including an instruction of reading out the predicted data to said cache memory of said storage device.

* * * * *